Patented Sept. 16, 1952

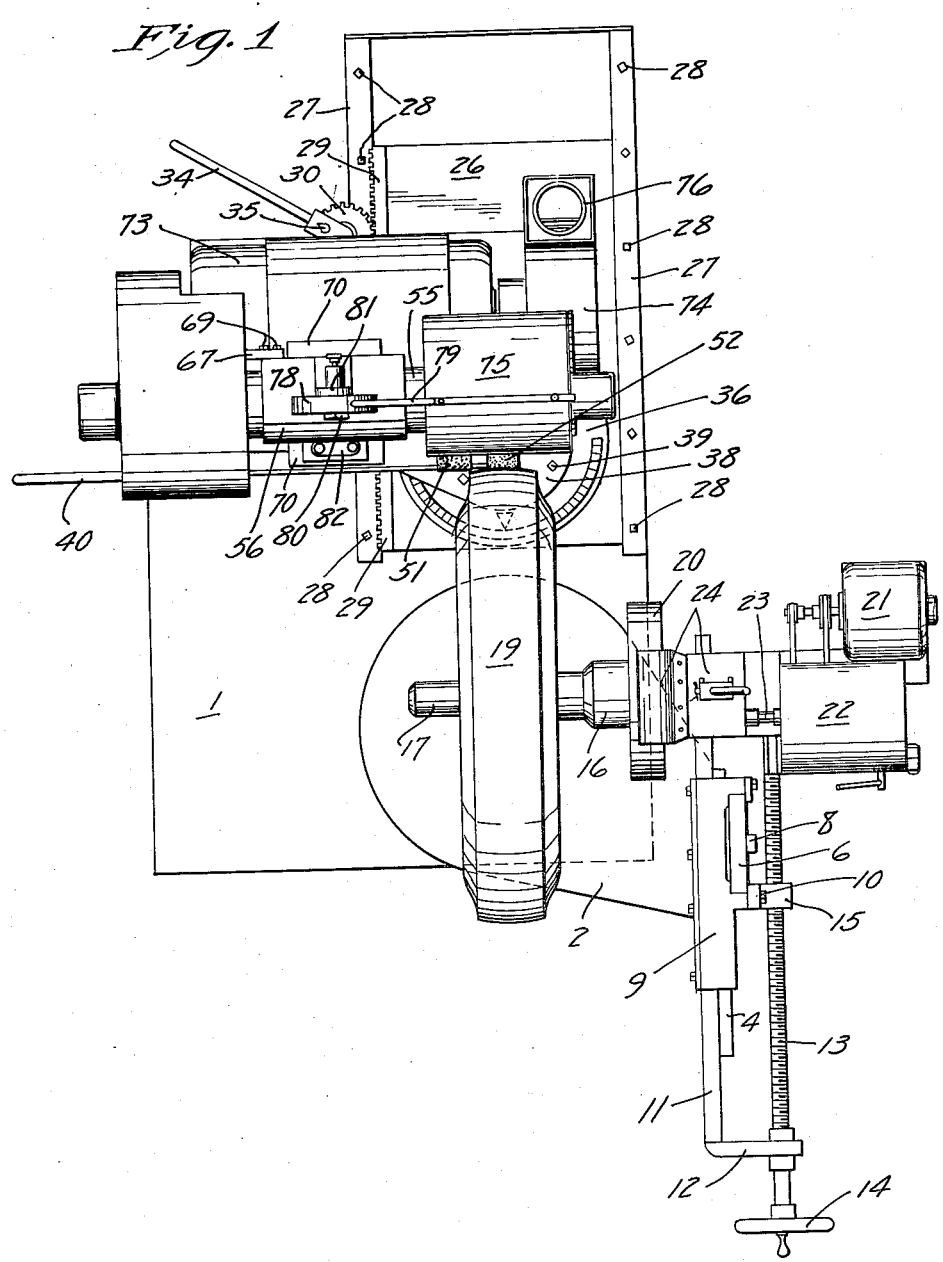

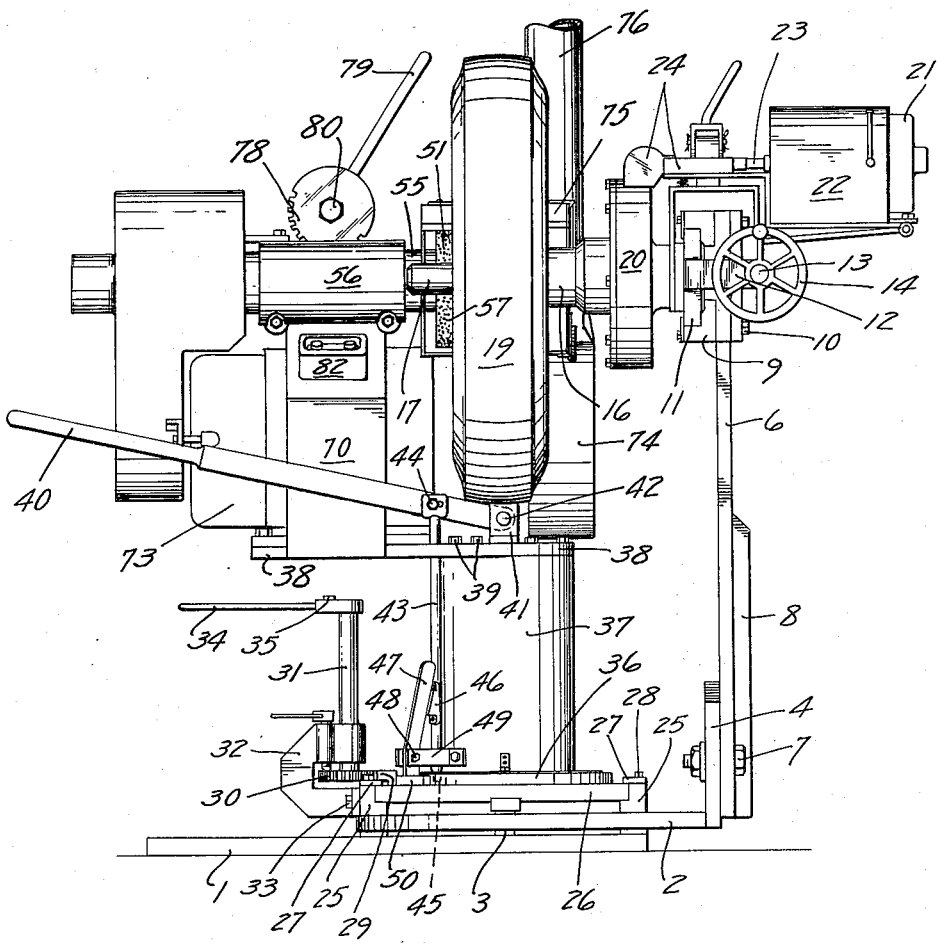

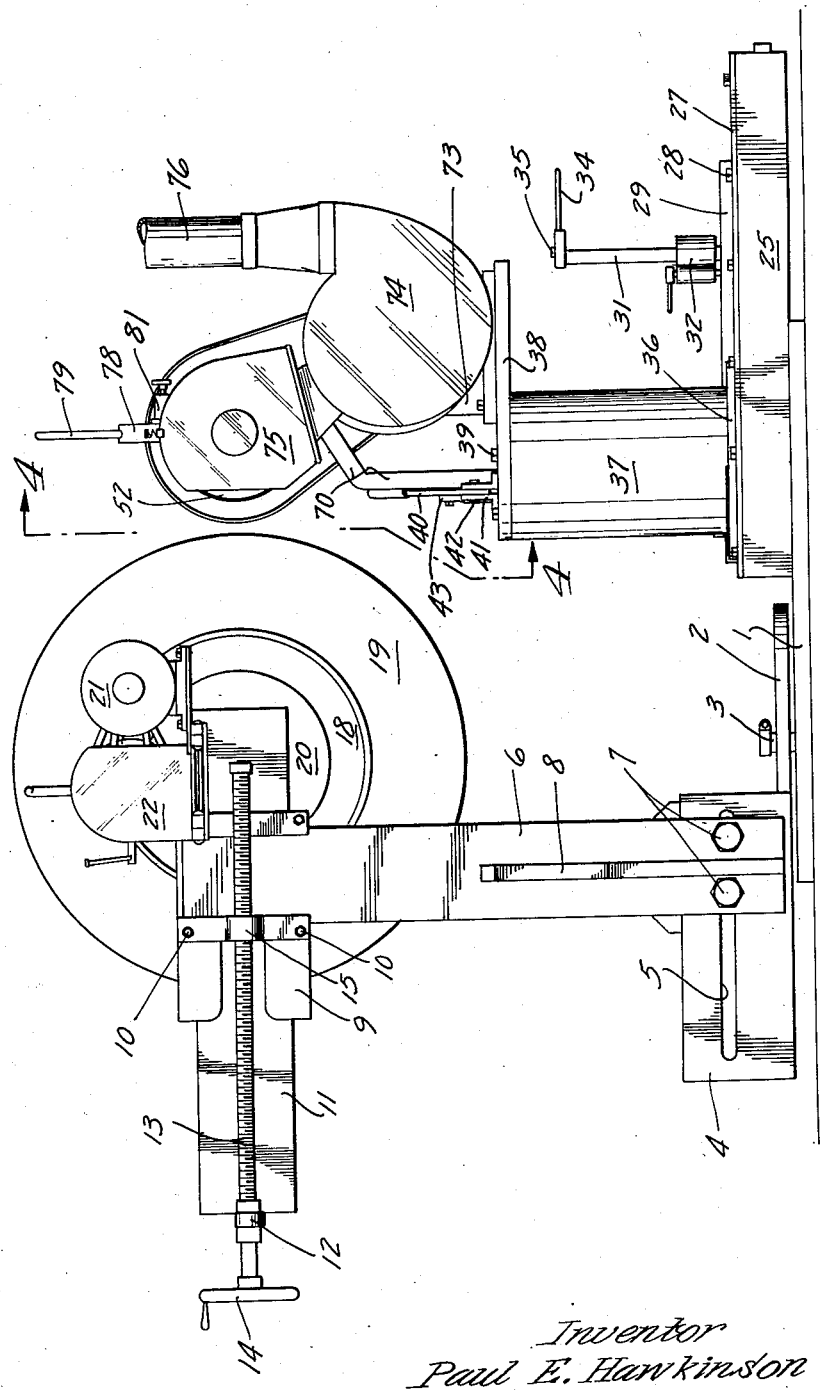

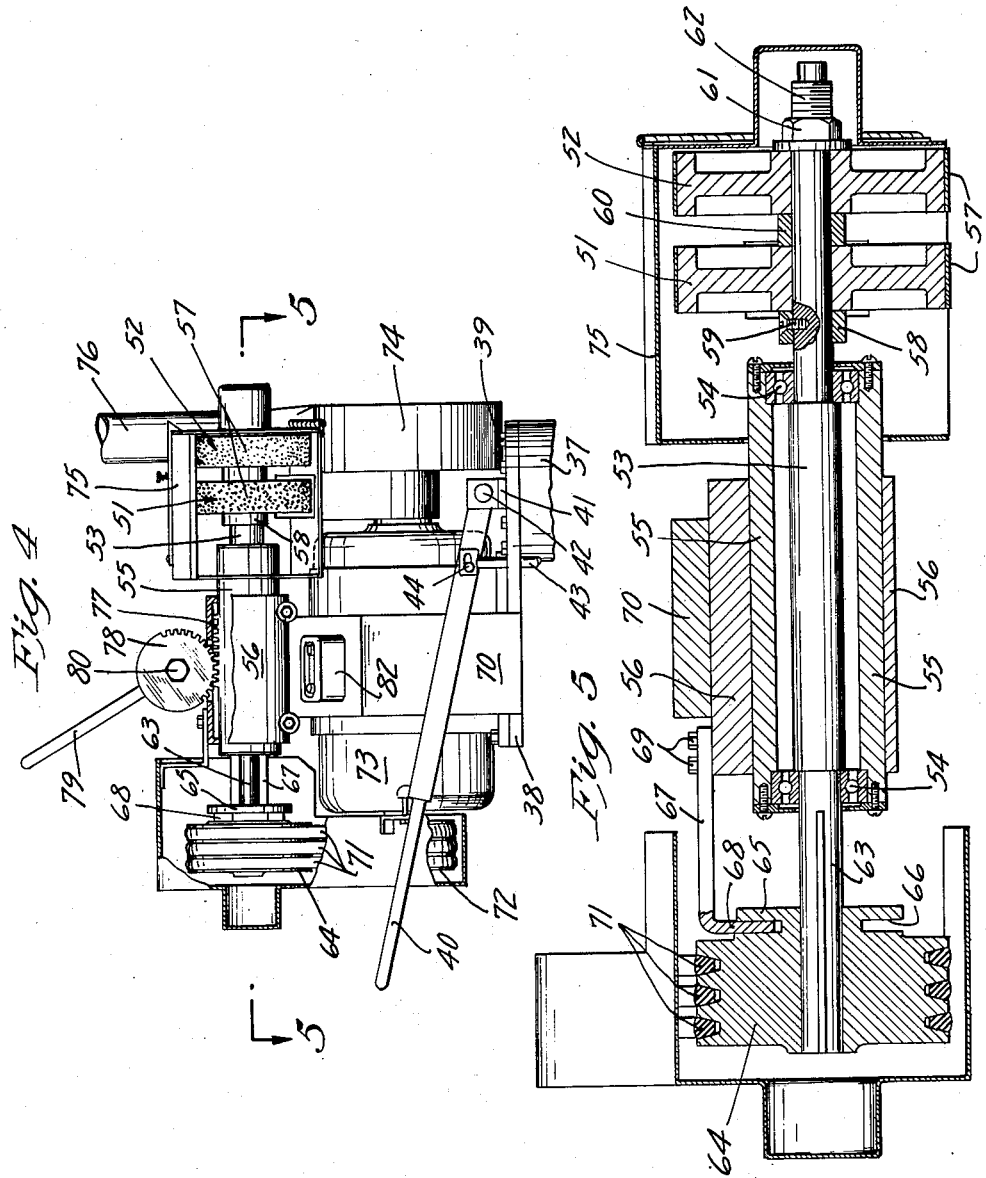

2,610,446

UNITED STATES PATENT OFFICE 2,610,446

MACHINE FOR BUFFING TIRES

Paul E. Hawkinson, Minneapolis, Minn., assignor to Paul E. Hawkinson Company, Minneapolis, Minn., a corporation of Minnesota Original application March 19, 1948, Serial No. 15,791. Divided and this application September 16, 1949, Serial No. 116,180

2 Claims. (Cl. 51—51)

My invention relates to a novel machine for preparing a worn pneumatic tire for the retreading operation and, more particularly, to a tire buffing and truing machine, and is a divisional application of my co-pending application, Serial No. 15,791, filed March 19, 1948.

More specifically, the primary object of my invention is the provision of a novel combination and arrangement of parts, whereby buffing wheels of varying degrees of roughness may be selectively brought into and out of engagement with the surface of the tire to be buffed without, in any way, slowing up the buffing operation.

The above and still further objects and advantages of my invention will become apparent from the following detailed specification, appended claims, and attached drawings.

Referring to the drawings, wherein like characters indicate like parts throughout the several views:

Fig. 1 is a view in plan of my novel buffing machine;

Fig. 2 is a front elevation of the machine of Fig. 1;

Fig. 3 is a view in side elevation of my novel buffing machine, some parts being broken away;

Fig. 4 is a fragmentary view in front elevation, some parts being broken away, shown as taken on the line 4—4 of Fig. 3; and Fig. 5 is an enlarged detail, taken on the line 5—5 of Fig. 4.

Referring with greater particularity to the drawings, the machine is shown comprising a base 1, preferably in the form of a plate. Plate 1 at one end thereof has a turntable 2 mounted on a vertical axis through the medium of a stub shaft 3. Turntable 2 is of circular form for most of its extent, but has one side projecting somewhat with a rectilinear edge, and the bracket 4 is secured to the turntable at said side by welding or the like. Bracket 4 has an elongated horizontally-extended slot 5, and a standard 6 has a flat side engaging the outer face of the bracket 4 and is connected to the bracket by a pair of headed bolts 7 passing through the slot 5. Standard 6 is of rectangular form in horizontal cross-section, and has a vertically-extending strengthening rib 8 at its outer side. Suitable rollers or bearings, not shown, may be interposed between the turntable 2 and the base 1 to prevent binding therebetween. Mounted on the standard 6 is a cross head or block 9. Block 9 is movable on the standard 6 and can be held in various fixed positions thereon by screws 10. A slide 11 fits in a groove on the side of the block 9 and is movable therein in a direction at right angles to the standard 6. The slide 11 has an arm 12 projecting from one side; and a screw 13 passes through said arm, said screw being provided with an operating hand wheel 14. The screw 13 passes through a threaded projection 15 of the cross head 9, which acts as a nut. The screw 13 is connected to the arm 12 so that rotation of the hand wheel 14 and screw 13 moves the slide 11 transversely of the head 9. The parts so far described, including the turntable 2, and the parts carried thereby, are substantially the same as shown in my prior Patent No. 2,392,667.

A spindle casing 16 is secured by welding or the like to one end portion of the slide 11 and projects laterally outwardly therefrom. Journalled in the casing 16 is a shaft 17, which extends laterally outwardly from the casing 16 and is adapted to support a wheel 18, upon which is mounted in a conventional manner a tire casing 19. The wheel 18 is rigidly secured to the shaft 17, by means not shown but fully disclosed in my copending application, beforementioned. Adjacent the slide 11, the casing 16 is enlarged to form a gear housing portion 20, which encompasses a worm gear, not shown, but mounted fast on the shaft 17.

The wheel 18 and tire 19 have rotary movements imparted from a motor 21 through the medium of a multiple speed clutch and gearing, not shown, but contained within a housing 22. A drive shaft 23 connects the driving mechanism within the housing 22 with gearing, not shown, but contained within a gear housing 24, that may be assumed to have meshing engagement with the worm gear contained within the housing 20, all of which is fully disclosed in my copending application, above identified.

The base 1 is provided at one end with a pair of spaced parallel guide bars 25, which are rectangularly notched to support a slide 26. The slide 26 is held in place by bars 27, which are secured to the guide bars 25 by means of bolts or the like 28. The slide 26 is adapted for movements toward and from the turntable 2, and mechanism for moving the same comprises a rack 29 fast on the slide 26, and a pinion 30 on one end of a pinion shaft 31 journalled in a bearing bracket 32, which is bolted or otherwise secured to one of the guide bars 27, as indicated at 33. The upper end of the shaft 31 is provided with a ratchet lever 34, which is of the conventional type having a pawl 35, which can be set to have the ratchet in neutral or right and left operative positions, so that the pinion 30 will be moved by swinging the lever 34 in one direction or the other to move the slide 26 toward or away from the turntable 2.

Mounted fast on the slide 26 is a circular base plate 36 which rotatively supports a pedestal 37 projecting upwardly therefrom and concentric therewith. A platform 38 is secured to the upper end of the pedestal 37 by headed bolts or the like 39. A turning lever 40 for the pedestal 37 is pivotally secured to brackets 41, as indicated at 42, said brackets being secured to the platform 38 directly over the pedestal 37. An index rod 43 is loosely connected at its upper end by bolt and slot connections 44 to the intermediate portion of the turning handle 40 and projects downwardly through an opening in the platform 38 adjacent the pedestal 37. The lower end of the index rod 43 is adapted to be received into an indexing aperture in the circular base plate 36, said aperture being shown by dotted lines in Fig. 2 and indicated by the numeral 45. Intermediate its ends, the index rod 43 is provided with a cam-acting lug 46, which is adapted to engage one end of a brake lever 47, which is pivoted as at 48 to a bracket 49 rigidly secured to the side of the pedestal 37. At its extreme lower end, the brake lever 47 is provided with a friction lug 50 that is engageable with the outer peripheral surface of the stationary circular base 36. The turning lever 40 is shown in Figs. 2 and 4 as being disposed in its lower position with the lower end of the index rod 43 seated in the aperture 45 of the base plate 36. Limited upward movement of the lever 40 will disengage the index rod 43 from the aperture 45 and permit turning of the pedestal 37 and parts carried thereby relative to the base plate 36. Continued upward movement of the lever 40 will cause the cam-acting lug 46 to engage the upper end of the brake lever 47 and cause the friction lug 50 to engage the outer peripheral surface of the base plate 36 so that the pedestal may be effectively locked in any desired position for a purpose which will hereinafter become apparent.

For the buffing of the crown of the tire 19, preparatory to application of new tread rubber thereto, I provide a pair of buffing or abrading wheels 51 and 52 mounted fast in axially-spaced relation to one end of a rotary shaft 53. The buffing wheels 51 and 52 are preferably of the type illustrated in my United States Patent No. 2,240,559. The shaft 53 is journalled by means of anti-friction bearings 54 in a bearing sleeve 55, which is slidably mounted in a housing 56 (see particularly Figs. 4 and 5). The buffing wheels 51 and 52 are covered with suitable abrasive material 57, which may be coarse in nature, as indicated on the wheel 51 in Fig. 4, or relatively fine, as indicated on the wheel 52 in Fig. 4. Referring particularly to Fig. 5, it will be seen that the buffing wheels 51 and 52 are held against endwise movement on the shaft 53 in one direction by a stop collar 58, secured thereto by means of a set screw or the like 59. A spacing collar 60 is interposed between the buffing wheels 51 and 52 to maintain the same in spaced relation, and a washer-equipped nut 61 screw-threaded on the extreme outer threaded end 62 of the shaft 53 securely clamps the buffing wheels 51 and 52 and spacing collar 60 therebetween and the collar 58. Opposite the buffing wheels 51 and 52, the rotary shaft 53 is extended beyond the bearing sleeve 55, as indicated at 63, and has mounted thereon for rotation therewith, but for axial sliding movements with respect thereto, a V-pulley 64. The V-pulley 64 is provided with a flange 65 which provides a circumferential channel 66. A bracket 67 has an inturned end 68 projected into the channel 66 and its opposite end rigidly secured to the housing 56 by means of machine screws or the like 69. This arrangement maintains the V-pulley 64 at a predetermined spaced relation to the end of the housing 56 irrespective of the position of the axially movable bearing sleeve 55 with respect thereto. The housing 56 and all elements carried thereby are supported from the platform 38 by means of a rigid bracket 70, the lower portion of which is secured by welding or the like to the platform 38 and the upper end portion of which is offset and secured by any suitable means to the housing 56. The buffing wheels 51 and 52 are driven by V-belts 71 running over the V-pulley 64 and another V-pulley 72 fast on the shaft of a motor 73. The motor 73 is mounted on the platform 38 directly behind the bracket 70 and in addition to driving the buffing wheels 51 and 54, operates an exhaust fan not shown but contained within a fan housing 74. The fan draws material buffed from the tire through a hood 75 partially enclosing the buffing wheels 51 and 52 and blows the same through an exhaust stack 76 to a suitable place of disposal, not shown.

It will be seen, by reference to Figs. 1 and 2, that the tire 19 lies in a vertical plane extending through the centers of pivotal movement of the turntable 2 and the pedestal 37. The positioning of the bearing sleeve 55 in the housing 56, that of the buffing wheels 51 and 52 on the shaft 53, and the spacing between the buffing wheels, is such that one or the other of the wheels 51 or 52 may be selectively moved into or out of the vertical plane of the centers of pivotal movement of the turntable 2 and the pedestal 3. Means for imparting axial movements to the bearing sleeve 55 and parts carried thereby includes a gear rack 77 on the bearing sleeve 55, a toothed gear segment 78 having meshing engagement with the gear rack 77, and a shifter handle 79 on the gear rack 77 on the bearing sleeve 55, a toothed as at 80 to a bracket 81 rigidly secured to the top of the housing 56 (see particularly Figs. 1–4 inclusive). In Figs. 1 and 2, the bearing sleeve 55 is positioned to bring the buffing wheel 52 into the vertical plane of the centers of pivotal movement of the turntable 2 and the pedestal 37. Means for imparting axial movements to the bearing and 5, the bearing sleeve 55 is moved to the other extreme position, whereby to bring the buffing wheel 51 into the vertical plane of the centers of pivotal movement of the turntable 2 and pedestal 37. A switch for controlling the motor 73 is mounted on the bracket 70 and is indicated by the numeral 82.

When it is desired to apply tread rubber of a predetermined width to the tire 19, it is often desirable to remove some of the material from the side edges of the crown thereof. The relative positions of the tires and buffing wheels for this operation are clearly shown in my prior Patent No. 2,392,667 (Fig. 2), and it is assumed that detailed description thereof is unnecessary. However, while the buffing wheel engages the tire 19, said tire is rotated at a predetermined speed by the motor 21 and gearing associated therewith. This speed is, of course, slower than the peripheral speed of the buffing wheels. Buffing the crown surface of the tire 19 is accomplished in exactly the same manner as set forth in my prior Patents No. 2,254,526 and 2,392,667. The crown surface of the tire is preferably buffed to provide a relatively rough surface for an efficient adhesion of the new tread rubber thereto. For this purpose, the buffing wheel 51 is moved to its operative position wherein it lies in the vertical plane extending between the pivot axes of the turntable 2 and the pedestal 37 and laterally centrally of the tire 19. When buffing the side edges of the crown portion of the tire 19, the bearing sleeve 55 is moved so as to bring the buffing wheel 52 into said vertical plane. The buffing wheel 52, having a relatively fine grinding surface, will impart a relatively smooth surface to the side edges of the crown of the tire 19. When buffing the crown surface of the tire 19, abrading surfaces 57 of the buffing wheels are maintained in position to have face to face engagement with the tire by alignment and seating of the index rod 43 in the aperture 45, under extreme downward movement of the lever 40. When the side edges of the crown portion of the tire are being buffed, the pedestal 37 and buffing mechanism carried thereby are frictionally locked against rotation by engagement of the friction lug 50 with the peripheral surface of the base plate 36 under extreme upward movement of the lever 40.

It will be seen, particularly by reference to Figs. 4 and 5, that the bracket 67 maintains alignment between the V-pulleys 64 and 72 regardless of axial movements of the bearing sleeve 55 and shaft 53.

This machine has been thoroughly tested and demonstrated in actual practice and has been found to be completely adequate for the accomplishment of the objectives set forth; and, while I have disclosed a preferred embodiment of the invention, it should be obvious that the same is capable of various modifications without departure from the scope and spirit of the invention as defined in the claims.

What I claim is:

1. In a device of the class described a stationary base member, a horizontally disposed support member rotatably supported on a stub shaft projecting vertically from said base member, a standard projecting vertically upwardly from said support member, an axle projecting horizontally from said standard for supporting a rim equipped casing mounting wheel, a horizontal slide member slidably supported on said base member, a pedestal projecting vertically from said slide member, a housing mounted on the upper end of said pedestal, a horizontal cylindrical bore in said housing, a sleeve disposed in said bore for axial movement therein, a rotary shaft journalled in said sleeve and having its opposite ends projecting axially therefrom, a pulley slidably secured to one end of said shaft for rotation therewith, a pair of buffing wheels secured to the opposite end of said shaft in axially spaced relation for movements to and from a vertical plane extending through the axis of said stub shaft and at right angles to said rotary shaft, a gear rack on the upper wall portion of said sleeve, a gear segment pivotally secured to said housing above said rack and meshing therewith, and a handle on said gear segment for imparting oscillatory movement thereto with corresponding reciprocatory movement to said sleeve for bringing said buffing wheels alternately into operative position in said vertical plane.

2. The structure according to claim 1 wherein said pulley is provided with an annular groove, a bracket member having one end thereof secured to said housing and said bracket member including an angular opposite end portion freely disposed in said groove.

PAUL E. HAWKINSON.

REFERENCES CITED

The following references are of record in the file of this patent:

UNITED STATES PATENTS

| Number | Name | Date |
|---|---|---|
| 1,632,600 | Hoagland | June 14, 1927 |
| 1,696,660 | Wegner | Dec. 25, 1928 |
| 2,243,461 | Haskins | May 27, 1941 |
| 2,248,143 | Weber | July 8, 1941 |
| 2,283,005 | Godfrey | May 12, 1942 |
| 2,392,667 | Harkinson | Jan. 8, 1946 |

FOREIGN PATENTS

| Number | Country | Date |
|---|---|---|
| 828,760 | France | Feb. 28, 1938 |